June 5, 1956
M. BODIAN
2,749,074
ALIGNER HEAD AND CANOPY ASSEMBLY
FOR A PENDANT LIGHT FIXTURE
Filed May 5, 1953
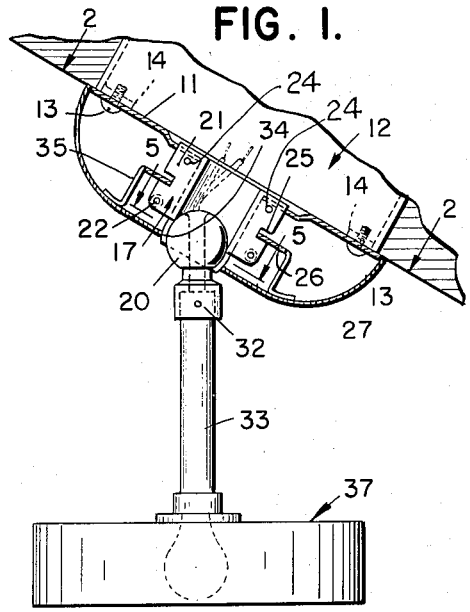
FIG. 1.
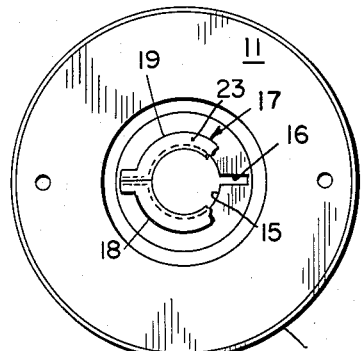
FIG. 2.
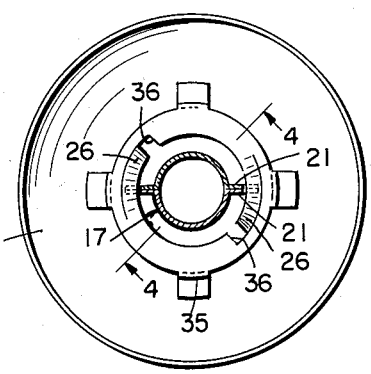
FIG. 3.
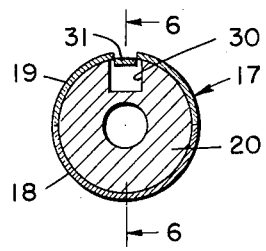
FIG. 5.
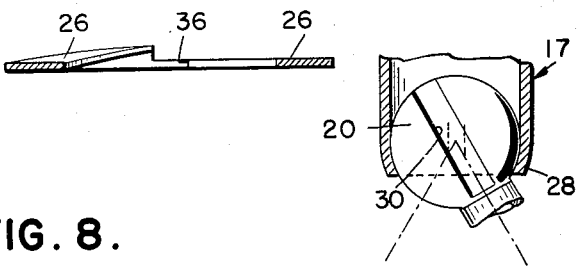
FIG. 4.    FIG. 7.
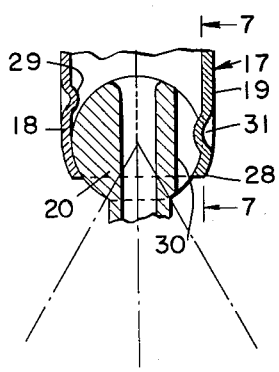
FIG. 6.
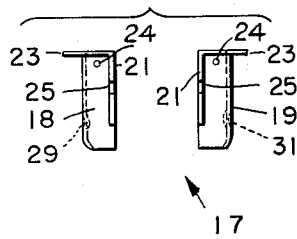
FIG. 8.
INVENTOR
MARCUS BODIAN
BY
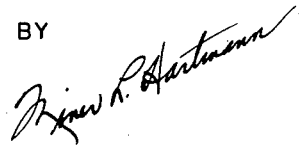
ATTORNEY

United States Patent Office 2,749,074
Patented June 5, 1956

2,749,074

ALIGNER HEAD AND CANOPY ASSEMBLY FOR A PENDANT LIGHT FIXTURE

Marcus Bodian, Los Angeles, Calif., assignor to Sunbeam Lighting Company, Los Angeles, Calif., a firm Application May 5, 1953, Serial No. 353,053

3 Claims. (Cl. 248—344)

This invention relates to an aligner head and canopy assembly for a pendant light fixture.

One object of the invention is to provide an aligner head for the stem or supporting rod of a pendant light fixture, including a readily attached canopy. Another object is to provide a swivel head for a rod in which the supporting socket is fabricated from stamped metal parts. Another object is to provide a pendant fixture hanger which holds the canopy tightly against the ceiling surface.

These and other objects are attained by my invention which will be understood from the following description, reference being made to the accompanying drawings in which:

Fig. 1 is an assembly view partly in section showing my swivel hanger with canopy in place on ceiling surface, and a pendant light fixture supported by said hanger;

Fig. 2 is a cross-sectional view taken on the line 2—2 of Fig. 1;

Fig. 3 is a view similar to Fig. 2 with the back plate removed to show interior construction;

Fig. 4 is a cross-sectional view taken on the line 4—4 of Fig. 3;

Fig. 5 is a cross-sectional view taken on the line 5—5 of Fig. 1;

Fig. 6 is a cross-sectional view taken on the line 6—6 of Fig. 5;

Fig. 7 is a cross-sectional view taken on the line 7—7 of Fig. 6; and

Fig. 8 is a disassembled view of the shaped component parts of the ball housing.

Referring to the drawings, a preferred embodiment of my invention consists of a back plate 11 which is adapted to be supported on an electric wiring outlet box 12 by means of screws 13 in the threaded ears 14 which are generally provided on the open face of the outlet box. The back plate 11 is provided with a central circular opening 15 and diametrically opposed slots 16 extending from the periphery of the circular opening 15, the central opening and the slots being adapted to receive a swivel housing 17. The swivel housing 17 consists of two stamped metal halves 18 and 19, which when placed in juxtaposition forms a cylinder to receive a ball 20, the two halves 18 and 19 being held together by wing tabs 21 extending radially outward from the joining edges of the cylinder. These wing tabs 21 are fastened together by rivets 22. The swivel housing halves 18 and 19 are each provided on the end opposite the ball holding portion with turned-out flanges 23, the assembly for the swivel housing 17 and the ball 20 being inserted into the central opening 15 and slots 16 prior to the fixing together installation of the two halves by the rivets 22, the retainer flanges 23 abutting the surface of the back plate 11, and thereby supporting the hanger assembly on the back plate 11. Holding dimples 24 are provided on the wing tabs 24 adjacent the face of the back plate, these dimples and the flanges 23 attaching the assembly to the back plate 11. The wing tabs 21 are each provided with a thread slot 25 to engage the twin helical surfaces 26 inside the canopy 27 as will be described below.

The ball 20 is held in place in the lower end of the swivel housing 17 by the turned-in rim 28 on the free or lower end of said housing, and by a retaining dimple 29 disposed in the side of the cylindrical swivel housing 17 intermediate the ends thereof. The ball 20 is provided on one side with a peripheral slot 30 which with the punched-in boss 31 in the housing prevents rotation of the ball relative to the axis of the housing, but does not prevent swiveling motion between the ball and the socket. Attached to the ball 20 is a sleeve coupling 32 adapted to receive a support stem 33 to which the other end of the fixture 37 itself is attached.

The canopy 27 consists of a saucer shaped metal stamping having a central opening 34 adapted to fit around the swivel housing 17 adjacent the turned-in rim 28. Inside the saucer shaped canopy there is provided a pair of diametrically opposed helical surfaces 26 which are stamped from sheet metal and supported at a selected suitable distance from the canopy opening 34 to engage the thread slots 25 in the wing tabs 21 of the swivel housing, by supporting legs 35. Aligning notches 36 are provided in the helical ring 26 to engage the wing tabs 21 when the canopy is placed over the swivel aligner head. When the canopy is rotated with the helical surfaces 26 engaged in the thread slots 25, the rim of the canopy is pressed tightly against the ceiling surface outside the periphery of the back plate 11. The supporting stem 33 may be attached in the coupling 32 by key pins or other suitable joining means.

Although I have shown the preferred structure above described, the slot 30 in the ball 20 may be omitted, and also the punched-in boss 31, so that full swivel action may be attained. It will also be obvious that the swivel housing may be attached to the base plate by riveting or welding, although I prefer the structure shown because it is less costly to manufacture, and because the parts are more easily assembled and installed with the less rigid connections in the preferred structure.

The advantages of my invention will be apparent. The swivel permits a wide angular movement and accommodates the hanging of vertically positioned stems of light fixtures from ceiling surfaces which are inclined from horizontal. The canopy is easily attached or detached over the socket by merely turning it so that the helical surfaces engage the slots in the wings and no other securing means are required. The swivel ball is non-rotatable so that the fixture remains vertically suspended in a suitable aligned and not rotatable position. The parts of my device are readily made from metal stampings assembled by riveting and welding except the ball itself which may be cast, or turned from bar stock. The holding tabs for the swivel housing serve to support the covering canopy, which simplifies the fabrication and installation.

I claim:

1. An aligner head for a pendant light fixture comprising a base plate adapted to be attached to a ceiling outlet box, said plate having a centrally disposed opening therethrough adapted to receive a winged swivel housing; a winged swivel housing having a retainer flange supporting said swivel housing on said base plate, said swivel housing consisting of two half stampings juxtaposed to form a cylinder having wings, said cylinder having an out-turned retainer flange on one end for attachment to said plate and an in-turned rim on the opposite end, said rim being adapted to retain a ball in said cylinder, the said wings being radial and diametrically opposed, the wings of the two halves being juxtaposed and riveted to hold said half stampings together, said wings having notches adapted to engage helical segments of a canopy;

and a ball in said swivel housing, said ball having a rod coupling member extending outwardly from said swivel housing.

2. An aligner head for a pendant light fixture comprising a base plate adapted to be attached to a ceiling outlet box, said plate having a centrally disposed opening therethrough adapted to receive a winged swivel housing; a winged swivel housing having a retainer flange supporting said swivel housing on said base plate, said swivel housing consisting of two half stampings juxtaposed to form a winged cylinder with an out-turned retainer flange on one end for attachment to said plate and an in-turned rim on the opposite end, said rim being adapted to retain a ball in said cylinder, the said wings being radial and diametrically opposed, the wings of the two halves being juxtaposed and riveted to hold said half stampings together, said wings having notches adapted to engage helical segments of a canopy; and a ball in said swivel housing and having a rod coupling means extending outwardly from said swivel housing, said ball being peripherally slotted on one side parallel to the axis of said coupling, said swivel housing having a punched-in boss adapted to engage said slot in said ball.

3. A swivel head for a pendant light fixture comprising a base plate adapted to be attached to a ceiling, said plate having a centrally disposed opening therethrough adapted to receive a winged swivel housing; a winged swivel housing having a retainer flange supporting said swivel housing on said base plate, said swivel housing consisting of two half stampings juxtaposed to form a winged cylinder with an out-turned retainer flange on one end for attachment to said plate and an in-turned rim on the opposite end, said rim being adapted to retain a ball in said cylinder, the said wings being radial and diametrically opposed, the wings of the two halves being juxtaposed and riveted to hold said half stampings together; and a ball in said swivel housing and having a rod coupling means extending outwardly from said swivel housing, said ball being peripherally slotted on one side parallel to the axis of said coupling, said swivel housing having a punched-in boss adapted to engage said slot in said ball.

References Cited in the file of this patent

UNITED STATES PATENTS

| | | |
|---|---|---|
| 1,297,211 | Magness | Mar. 11, 1919 |
| 1,487,891 | Ryden | Mar. 25, 1924 |
| 1,894,063 | Schroeder | Jan. 10, 1933 |
| 1,901,235 | Glowacki | Mar. 14, 1933 |
| 1,927,703 | Glowacki | Sept. 19, 1933 |
| 1,934,624 | Guth | Nov. 7, 1933 |
| 2,280,505 | Beck | Apr. 21, 1942 |

FOREIGN PATENTS

| | | |
|---|---|---|
| 182,097 | Great Britain | Aug. 2, 1923 |
| 761,140 | France | Jan. 3, 1934 |